(12) United States Patent
Jaasma et al.

(10) Patent No.: US 6,168,136 B1
(45) Date of Patent: Jan. 2, 2001

(54) GAS VALVE

(75) Inventors: Servatius Alfons Maria Jaasma; Marcus Johannes Petrus Gerardus Den Hartog, both of Eindhoven (NL)

(73) Assignee: Vialle Beheer B.V., Son (NL)

( * ) Notice: Under 35 U.S.C. 154(b), the term of this patent shall be extended for 0 days.

(21) Appl. No.: 09/125,202

(22) PCT Filed: Feb. 11, 1997

(86) PCT No.: PCT/NL97/00053

§ 371 Date: Nov. 20, 1998

§ 102(e) Date: Nov. 20, 1998

(87) PCT Pub. No.: WO97/30280

PCT Pub. Date: Aug. 21, 1997

(30) Foreign Application Priority Data

Feb. 13, 1996 (NL) .................................................... 1002330

(51) Int. Cl.[7] .............................. F16K 31/06; B65B 1/32
(52) U.S. Cl. .............................. 251/129.17; 251/129.18; 137/271; 239/585.1
(58) Field of Search ....................... 137/271; 251/129.17, 251/129.18; 239/585.1

(56) References Cited

U.S. PATENT DOCUMENTS

| 4,365,747 | * | 12/1982 | Knapp et al. | 251/129.17 X |
| 4,662,567 | * | 5/1987 | Knapp | 251/129.18 X |
| 4,917,351 | * | 4/1990 | Lindbloom et al. | 251/129.18 |
| 5,374,029 | * | 12/1994 | Bailey | 251/129.17 X |

FOREIGN PATENT DOCUMENTS

| 0 581 391 | 2/1994 | (EP) . |
| WO 94/15092 | 7/1994 | (WO) . |

* cited by examiner

*Primary Examiner*—John Rivell
(74) *Attorney, Agent, or Firm*—Young & Thompson

(57) ABSTRACT

Gas valve (1) to be arranged in an intake port (2) of a combustion engine. In order to be able to give the valve different flow characteristics in a simple manner, the valve (1) comprises two plates (8, 24) disposed parallel to one another, between which the valve body (9) is arranged with clearance, which valve body (9) can shut off a discharge opening (11). By varying the degree of clearance, the amount of gas passing through the valve (1) can be varied. This variation in the valve lift can be achieved by adapting the height of an adjusting ring (5).

7 Claims, 2 Drawing Sheets

GAS VALVE

CROSS REFERENCE TO RELATED APPLICATION

This is the 35 USC 371 National Stage of International application PCT/NL97/00053 filed on Feb. 11, 1997, which designated the United States of America.

FIELD OF THE INVENTION

The present invention relates to a gas valve which is to be arranged in the intake port of a combustion engine according to the preamble of claim 1.

BACKGROUND OF THE INVENTION

WO 94/15092 describes the general layout for a gas injector for an internal combustion engine.

The introduction of a gaseous medium into an internal combustion engine requires very accurate metering while, on the other hand, the valve which is used for this purpose needs to be as sturdy as possible. Attempts are being made to achieve sequential injection of fuel. On the one hand, this ensures still more accurate metering of the fuel to each individual cylinder and, on the other hand, there is no longer a risk of fire back particularly during injection of gas.

Fire back occurs in particular if, during starting, the intake port is completely filled with a combustible mixture, an intake valve is opened and, during starting, the sparking plug associated with the intake valve in question sparks. This can result in considerable damage to the intake port or air filter. By means of sequential injection as close as possible to the intake valves, the amount of fuel which is present in the intake manifold can be considerably reduced, as a result of which the effects of fire back are eliminated or, at any rate, limited.

By introducing the fuel as close as possible to the intake valves, the combustion engine will react particularly quickly to movements of the accelerator pedal.

However, the use of sequential injection requires a separate valve for each cylinder, which valve is able to inject the entire quantity of gas which is required for one operating cycle within the time for which the intake valve in question is open.

The maximum metering accuracy is achieved if the injection time required for each engine is equal to or shorter than the opening time of the intake valve.

SUMMARY OF THE INVENTION

This means, on the one hand, that the metering accuracy of each valve needs to be particularly high, while, on the otherhand, the cost price has to be as low as possible, in order to make sequential injection possible in an economically viable manner.

As a result, it should be possible to adapt a valve of this kind in a simple manner to different combustion engines.

The objects described above are achieved with a gas valve as described above having the characterising features of claim 1.

The invention is based on the insight that the valve lift of the valve, which is to a large extent the defining parameter for the amount of gas flowing through, can be made adjustable in a simple manner by enclosing the valve body between two parallel plates which define the valve lift of the valve body. The distance between these two parallel plates is fixed by an adjusting ring.

If the valve has to be adapted to a different combustion engine, the adjusting ring can simply be made thicker or thinner.

The valve lift is of great importance, since the time for injecting gas is relatively short and the amount of gas which has to flow through is relatively large.

In a typical example, the valve is in an at least partially open position for 25% of the time.

A typical valve lift of the valve body is 0.25 mm.

In accordance with an advantageous embodiment of the invention, the gas is injected via an annular duct through a series of radial intake openings arranged in the circumference of the adjusting ring.

The actuating part is preferably of electrical form and comprises an actuating rod which is arranged in a translational manner with respect to the valve housing and, at the end remote from the valve body, is provided with a ferromagnetic member which is arranged so as to interact with a coil, and return means being arranged on the actuating element.

The problems which may possibly arise in guiding the valve body/actuating rod with respect to the remaining parts of the housing can be solved by arranging a diaphragm at that location. By providing the actuating rod with a further diaphragm, these diaphragms can be used to provide guidance. That means that it is not necessary to provide a sliding-contact bearing. This is particularly important in order to avoid the lubrication problems which arise when using vaporous LPG or gaseous LNG.

The actuating coil described above may be designed in any manner known from the prior art, but preferably it comprises a ferromagnetic core around which a winding is arranged, which core comprises a free end face, the actuating member comprising a cylindrical part provided with an end face designed to interact with the end face of the core.

Preferably, the return means comprise a spring which acts on the ferromagnetic member. This spring serves to take up considerable loads. Accelerations of 3000–4000 m/s$^2$ are not unusual. It should be pointed out that the actuating rod described above also has damping and resilient properties.

BRIEF DESCRIPTION OF THE DRAWINGS

The invention will be explained in more detail below with reference to an exemplary embodiment depicted in the drawings, in which.

DETAILED DESCRIPTION OF THE INVENTION

Figure 1:
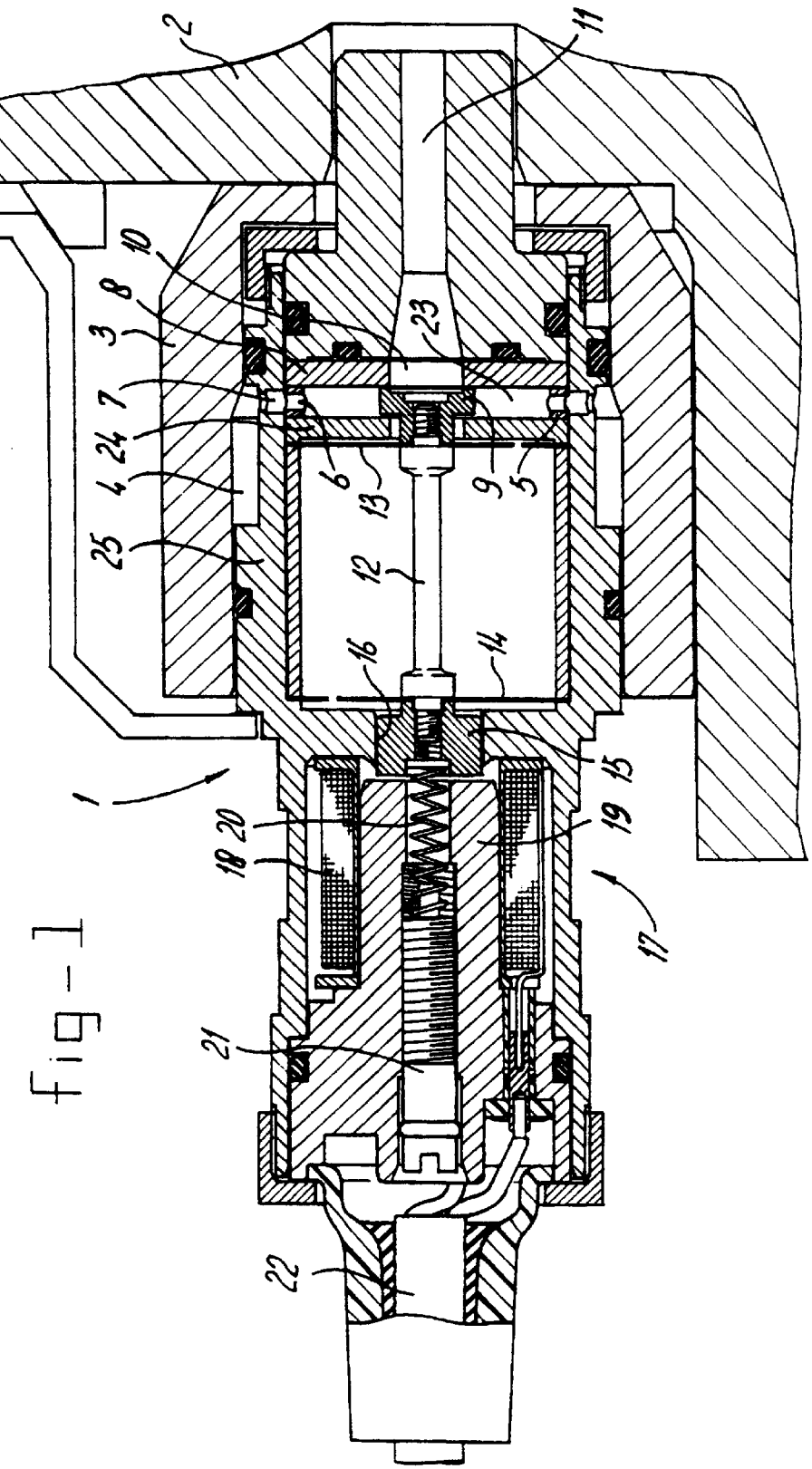
FIG. 1 shows a cross-section of the valve according to the invention in the closed position.
Figure 2:
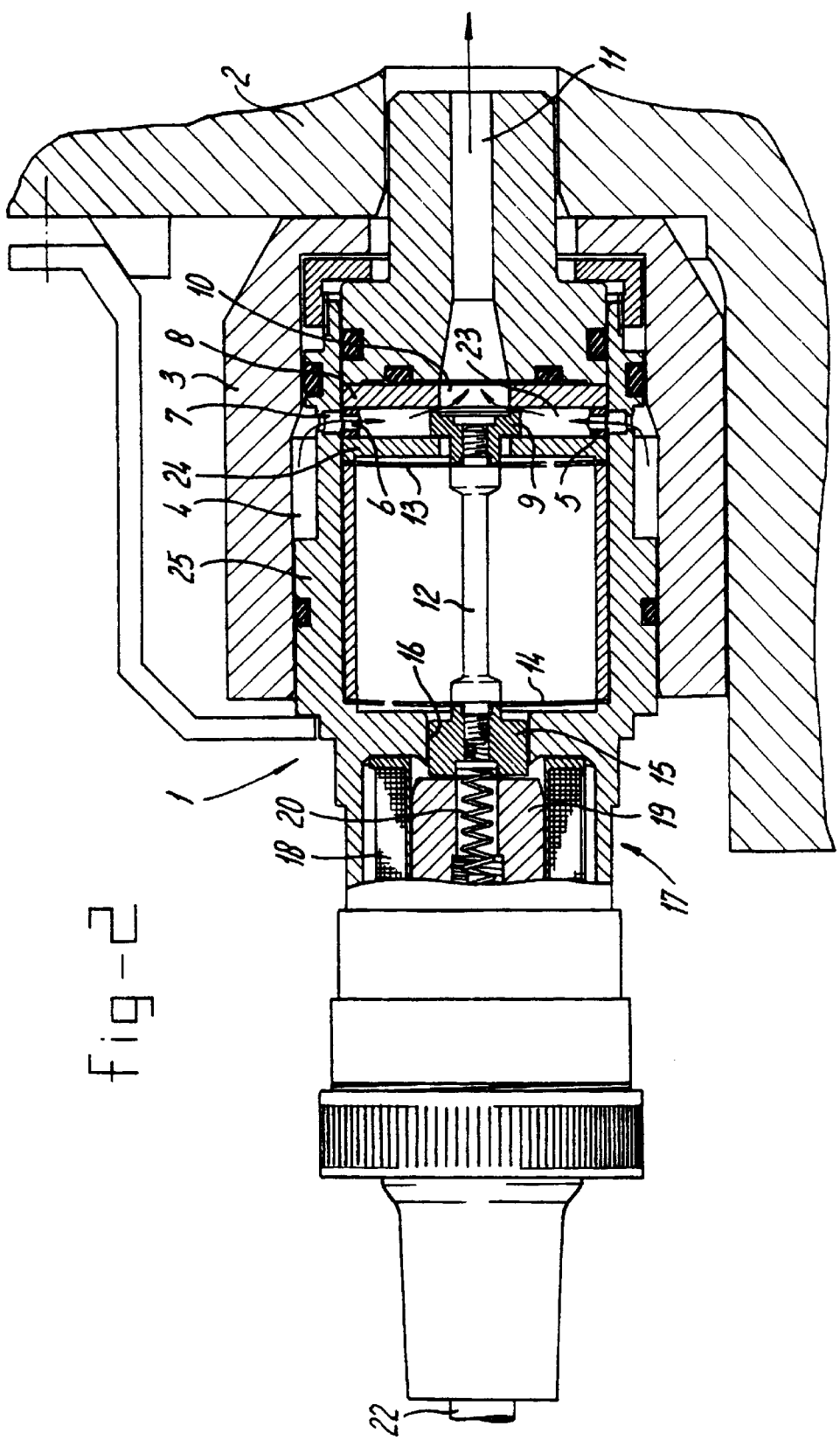
FIG. 2 shows the valve according to FIG. 1, partially in cross-section, in the open position.

In the drawings, 1 indicates the gas valve according to the invention. This is intended to be arranged in the intake manifold of an internal combustion engine and to deliver a gas. This differs from designs in which liquefied fuel gas is injected in the liquid state. The inlet manifold is indicated by 2. A fuel rail 3, which may be provided with various bores in which valves can be mounted, is arranged on this inlet manifold. These valves may be fastened in any manner known from the prior art.

The discharge port 11 of the valve opens into the intake manifold. The discharge port 11 opens on the other side into an opening 10 in a seating plate 8. Valve body 9 may adjoin this seating plate 8 in a sealing manner. Valve body 9 is enclosed in a valve chamber 23 which is delimited by the seating plate 8 described above, stop plate 24 and adjusting ring 5. The distance between the plates 8 and 24 is determined by the thickness of the adjusting ring 5. By exchanging the adjusting ring, the distance between the plates, and thus the valve lift of valve body 9, can be varied.

Adjusting ring 5 is provided with openings 6 which emerge into an annular duct 7 which is connected to fuel rail 3.

Valve body 9 is connected to an actuating rod 12. This may be a rod made of steel and having a diameter of ±3 mm. This rod is fastened to the housing 25 of the valve with diaphragms 13 and 14. Both diaphragm 13 and diaphragm 14 are provided with an opening. Sealing is achieved by means of the various O-rings. Actuating rod 12 is connected to a cylindrical ferromagnetic part 15 which moves translationally in bore 16. Ferrogmagnetic part 15 interacts with core 19 of a coil which is indicated overall by 17 and is provided with a winding 18. The power supply of this coil is indicated by 22. Moreover, a spring 20, the prestressing of which can be set by means of adjusting screw 21, acts on cylindrical ferromagnetic part 15.

Due to the chosen arrangement of valve body 9 and exhaust opening 10 in chamber 23, the gas pressure from intake 4 will exert a force acting in the closure direction on the valve body. The sealing between the valve body and the seating plate can be achieved in a particularly simple manner, since the seating plate merely has to be of flat design. The actuating rod 12 has a certain degree of elastic properties, which are important, in particular, when opening and closing the valve.

An example which may be given here is that the valve was operated at a pressure of 8 bar in intake 4 while the pressure in the intake manifold was 2.2 bar (supercharged engine).

The area of opening 10 was approximately 10 mm$^2$, while the valve lift of valve body 9 was 0.25 mm.

If the valve used here is used for sequential injection, in addition to the usual advantages it is moreover possible to design the control system such that, specifically during starting, no gas is injected during the first 1 to 2 revolutions of the combustion engine. During this time, the computer control can set all the parameters of the combustion engine in an optimum manner. Only then does fuel injection take place.

It can be seen from the drawing that the valve according to the invention can be of particularly compact and flat design. In this way, the valve can be used not only in newly designed intake manifolds, but can also be retrofitted in existing installations.

The seating plate 8 serves simultaneously as a sealing means for valve body 9 and as a stop.

The valve described above can be produced in a particularly simple and inexpensive manner. Its delivery can easily be varied, without additional cost, by varying the adjusting ring, which is always required. As a result, it is possible for the delivery to correspond to the available intake period.

It is clear from the above that numerous variants on the valve shown above are possible. These are all considered to lie within the scope of the present application, as defined in the appended claims.

What is claimed is:

1. Gas valve to be arranged in an intake port of an internal combustion engine, comprising a discharge line which can be connected to the intake port and which is connected at a discharge opening to a valve chamber, said valve chamber being provided with an intake opening of a feed line which is to be connected to a gas supply, a valve body, which closes off the discharge opening and which is arranged displaceably in the valve chamber and is connected to a coil-actuated actuating part, being present between the feed line and the discharge line, wherein said valve body is held with clearance between two plates, said clearance determining the stroke of the valve body and which plates are held apart by an exchangeable adjusting ring provided with a series of inlet openings along its circumference.

2. Gas valve according to claim 1, wherein the inlet openings provided on the circumference of the adjusting ring are radial.

3. Gas valve according to claim 1, wherein the actuating part comprises an actuating rod which is arranged in a translational manner with respect to a housing of the valve and, at the end remote from the valve body, is provided with a ferromagnetic member which is arranged so as to interact with a coil, and return means being arranged on an actuating member.

4. Gas valve according to claim 3, wherein the actuating rod comprises guide means which include a diaphragm.

5. Gas valve according to claim 3, wherein the actuating rod is fastened, near the ends, to a diaphragm.

6. Gas valve according to claim 3, wherein the coil comprises a ferromagnetic core around which a winding is arranged, which core comprises a free end face, the actuating member comprising a cylindrical part provided with an end face designed to interact with the end face of the core.

7. Gas valve according to claim 3, wherein the return means comprise a spring which acts on the ferromagnetic member.

* * * * *